United States Patent [19]
Zaviska et al.

[11] Patent Number: 5,564,798
[45] Date of Patent: Oct. 15, 1996

[54] ANTI-LOCKING HYDRAULIC BRAKE SYSTEM

[75] Inventors: Dalibor Zaviska, Frankfurt am Main; Paul Linhoff, Oberursel, both of Germany

[73] Assignee: Alfred Teves GmbH, Germany

[21] Appl. No.: 938,155

[22] PCT Filed: Mar. 19, 1992

[86] PCT No.: PCT/EP92/00608

§ 371 Date: Nov. 30, 1992

§ 102(e) Date: Nov. 30, 1992

[87] PCT Pub. No.: WO92/17356

PCT Pub. Date: Oct. 15, 1992

[30] Foreign Application Priority Data

Mar. 30, 1991 [DE] Germany .................. 41 10 528.1

[51] Int. Cl.⁶ .................. B60T 8/32; B60T 8/48
[52] U.S. Cl. .................. 303/116.1; 303/DIG. 4; 303/900
[58] Field of Search .................. 303/84.1, 116.1, 303/116.2, 119.1, DIG. 1–4, 900, 901

[56] References Cited

U.S. PATENT DOCUMENTS

| | | | |
|---|---|---|---|
| 4,346,944 | 8/1982 | Leiber | 303/900 X |
| 4,636,009 | 1/1987 | Tsuru et al. | 303/116.1 |
| 4,807,944 | 2/1989 | Weise | 303/DIG. 4 X |
| 5,207,485 | 5/1993 | Tröster | 303/113.2 |
| 5,209,553 | 5/1993 | Burgdorf et al. | 303/116.1 |
| 5,246,280 | 9/1993 | Sigl | 303/119.1 X |
| 5,255,963 | 10/1993 | Altmann et al. | 303/116.1 |

FOREIGN PATENT DOCUMENTS

| | | |
|---|---|---|
| 0303261 | 2/1989 | European Pat. Off. . |
| 3247497 | 6/1984 | Germany . |
| 3438646 | 5/1985 | Germany . |
| 3505410 | 8/1986 | Germany . |
| 3816073 | 11/1989 | Germany . |
| 3929464 | 3/1990 | Germany . |
| 3834539 | 4/1990 | Germany . |
| 3912322 | 10/1990 | Germany . |
| 4004316 | 2/1991 | Germany . |
| 3938734 | 5/1991 | Germany . |
| 59-8554 | 1/1984 | Japan . |
| 60-25834 | 2/1985 | Japan . |
| 61-160343 | 7/1986 | Japan . |
| 2056606 | 3/1981 | United Kingdom . |
| WO9015738 | 12/1990 | WIPO . |

*Primary Examiner*—Josie Ballato
*Attorney, Agent, or Firm*—J. Gordon Lewis; Thomas N. Twomey

[57] ABSTRACT

An anti-locking brake system is provided, wherein, during a control operation, the brake conduit is blocked by a separating valve. The wheel brakes, through a return conduit, are in communication with the intake side of a pump. Provided in the return conduit is an outlet valve. The pressure side of the pump, through a pressure conduit, is in communication with the brake conduit between the separating valve and the wheel brake. A restriction element is provided in the pressure conduit. Check valves between the master brake cylinder and the pressure side of the pump enable pressure fluid, if an enhanced amount of pressure fluid is required by the control circuit, to be fed from the master brake cylinder into the control circuit.

8 Claims, 5 Drawing Sheets

FIG 1a
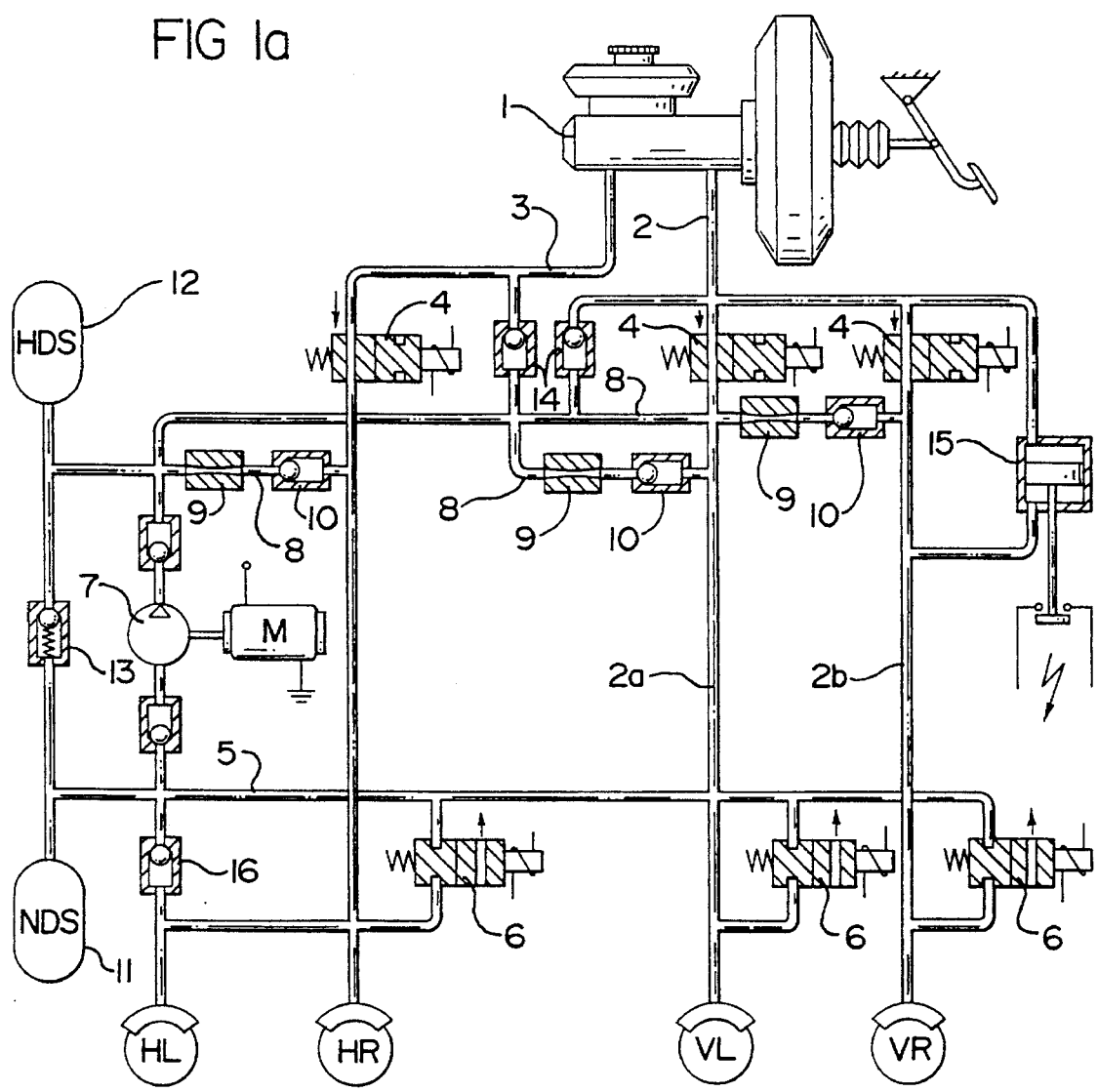
DIAPHRAGM
FIG 1b
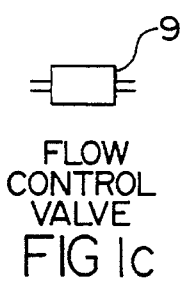
FLOW
CONTROL
VALVE
FIG 1c

ANTI-LOCKING HYDRAULIC BRAKE SYSTEM

BACKGROUND OF THE INVENTION

The present invention relates to an anti-locking hydraulic brake system comprising a master brake cylinder connected, through brake conduits, to wheel brakes, further comprising a separating valve for blocking the brake conduit, a return conduit containing an outlet valve connecting the wheel brake to the intake side of a pump, a pressure conduit connecting the pressure side of the pump to the brake conduit between the separating valve and the wheel brake.

A brake system of the aforementioned type is disclosed, for example, by U.S. Pat. No. 4,636,009. In the system shown therein, the pressure in the wheel brakes can be increased, lowered or maintained constant, through a 3-way/3-position valve that blocks or releases the brake conduit and the return conduit, depending on the desired pressure variation.

A 3-way/3-position valve is of a complex design. It has been previously suggested to provide only one electromagnetically operable outlet valve that blocks or releases the return conduit, and to insert a restriction valve into the brake conduit so that the pump, through a diaphragm, supplies pressure fluid to the wheel brake. In that configuration, the pressure in the wheel brake can be decreased or increased, depending on whether the amount of pressure fluid per unit of time flowing out through the outlet valve is greater than that flowing in through the restriction valve. According to the state-of-the-art design, the restriction valve is provided in the brake conduit to operate also during a non-controlled brake operation. Admittedly, it has already been suggested to design the throttle switchable in order to be introduced into the brake conduit only during a control operation. However, a design of this type necessarily involves substantial mechanical efforts because corresponding switch means are required.

It is an object of the invention to design the valve switching mechanism with the throttle rigidly installed within the system so that no additional switching means are required.

It is, therefore, suggested by the invention to provide a throttle in the pressure conduit of the pump, i.e. external to the brake conduit.

It is another object of the invention to provide means enabling additional pressure fluid to be introduced into the control circuit below the separating valve. This is accomplished by connecting the master brake cylinder and the pressure side of the pump through a check valve opening toward the pressure side of the pump.

The restriction valve may comprise a firmly adjusted diaphragm of constant cross-section or a flow control valve. A flow control valve is preferred because a predetermined pressure could be adjusted on the outlet of the pump by adapting the delivery capacity of the pump to the control pattern of the flow control valve.

The separating valve can be actuated electromagnetically and hydraulically. Hydraulic actuation can be performed in various ways. For example, the separating valve can be actuated by the pressure on the output of the pump or through a plunger secured to or in abutment with the piston of the low pressure accumulator.

Moreover, it may be feasible to provide an electromagnetically actuable inlet valve in addition to the restriction valve. Such an inlet valve would be required to switch only in exceptional situations because a restriction valve is also provided. Such an exceptional situation would occur, for example, if the pressure in the wheel brake needed to be substantially lowered. In that case it would be necessary to completely eliminate the pressure supply through the restriction valve.

These and other features of the present invention can best be understood from the following specification and drawings, of which the following is a brief description.

BRIEF DESCRIPTION OF DRAWINGS

FIG. 1 shows a brake system with electromagnetically actuable separating valves.

FIGS. 1b and 1c symbolically illustrate (in block form) a restriction element of FIG. 1a in the form of a diaphragm and a flow control valve respectively.

DETAILED DESCRIPTION OF THE INVENTION

Figure 2:
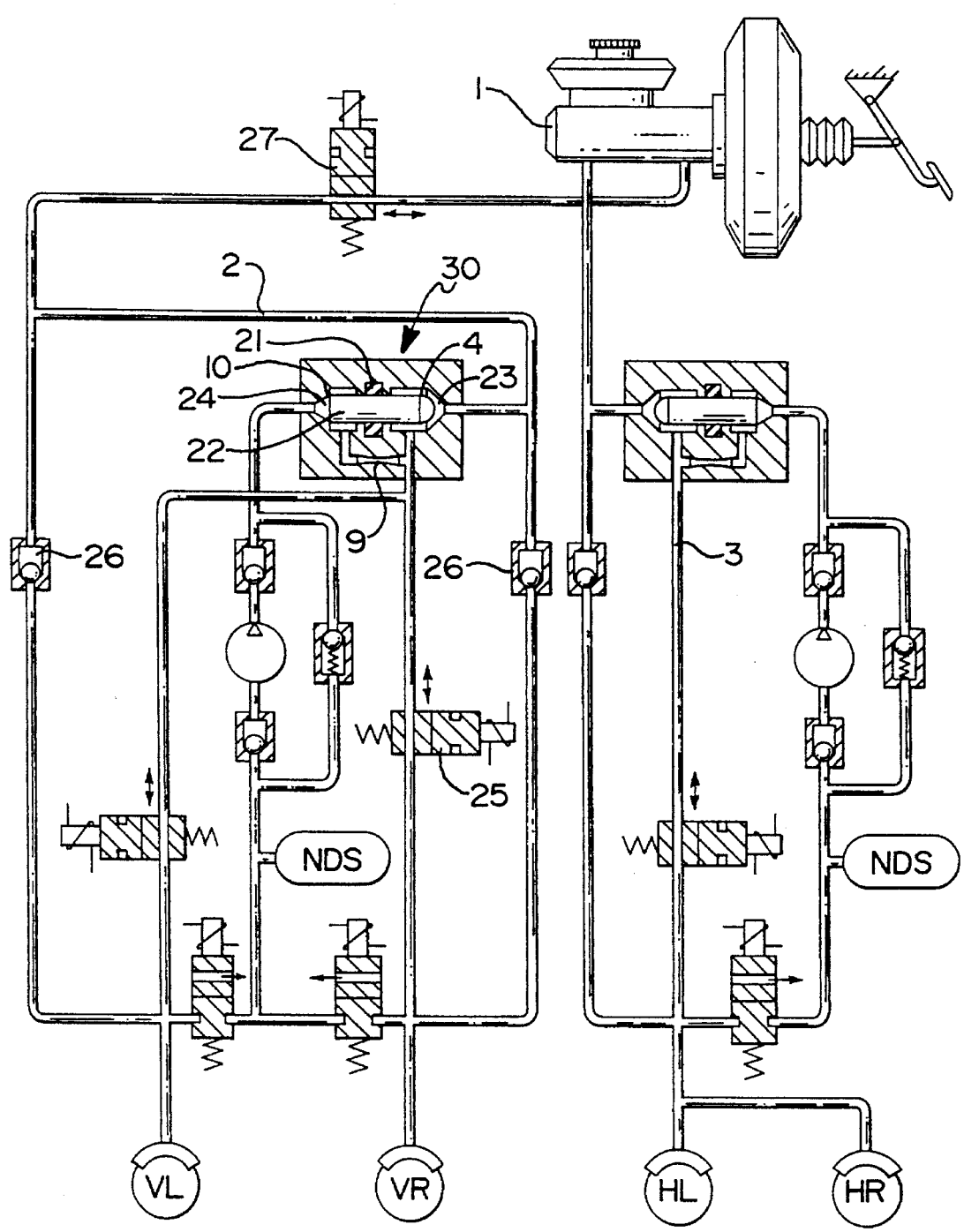
FIG. 2 shows a brake system with hydraulically actuable separating valves.

According to FIG. 1a, the brake system comprises a master brake cylinder 1 connected to the wheel brakes of the vehicle through brake conduits 2 and 3. The brake conduit 2 branches into two brake conduits 2a and 2b and leads to the left and right (VL and VR) front wheel brakes of the automotive vehicle. Brake conduit 3 leads to the wheel brakes of the left and right (HL and HR) rear wheels. One electromagnetically actuable separating valve 4 is provided in brake conduit 3 and branch conduits 2a and 2b respectively. In the basic position, the separating valve 4 keeps the brake conduit open. When the actuating magnet is energized, the respective valve switches to the blocking position.

The wheel brakes, individually (VL,VR) and in pairs (HL,HR), respectively, are in communication with the intake side of the pump 7 through one return conduit 5. One outlet valve 6 is provided in the return conduit. The pump delivers pressure fluid, through a branching pressure conduit 8, to the brake conduits 2a, 2b, 3 below the separating valve 4. One restriction element 9 and a check valve 10 are connected in series in the branch conduit of the pressure conduit 8. The restriction element 9 may comprise a firmly adjusted diaphragm (FIG. 1b) of constant cross-section or a flow control valve (FIG. 1c). The check valve 10 opens toward the brake conduit. A low pressure accumulator 11 is provided on the intake side of the pump, while a high pressure accumulator 12 is provided on the pressure side of the pump.

A uniform pressure fluid flow is obtained with the aid of a flow control valve irrespective of the pressure gradient.

Although the use of a diaphragm is structurally simpler, it involves a dependence between pressure gradient and pressure fluid flow that is not always desirable.

Although it has been found that a diaphragm will suffice for the rear wheel brakes, it is advisable to use a flow control for the front wheel brakes.

Depending on the layout of the brake system, a high pressure accumulator also can be foregone. This will especially apply once the delivery capacity oil the pump is so adjusted to the restriction element that an adequate pressure is adjusted on the outlet of the pump.

In addition, a release valve 13 may be provided between the pressure side and the intake side of the pump to limit the pump pressure. The release valve may be a component part of the high pressure accumulator so that the valve is automatically opened once the high pressure accumulator has reached a predetermined volume. Moreover, check valves 14 connect the working chambers of the master brake cylinder to the pressure side of the pump. The check valves open toward the pump. Moreover, a pressure switch 15 may be provided measuring the pressure difference between the wheel brakes and the master brake cylinder. Once the pressure in the master brake cylinder is decreased below the pressure of the wheel brake cylinder, one or more separating valves 4 open, thereby causing a pressure equilibrium.

According to FIG. 1a, one pump with high pressure and low pressure accumulators is provided for the entire brake system. However, each brake circuit may have an auxiliary pressure supply system. Any desired circuit divisions may be used.

The check valve 16 is to prevent a greater volume from being pumped into the system than would correspond to the volume intake in the rapid release and reactuation of the brake pedal during a control operation. This would result in residual pressures in the breather bore position of the master brake cylinder. The check valve 16 can be eliminated when employing master brake cylinders that respond to residual pressures, if any.

The brake system shown in FIG. 2 is of a design similar to that depicted in FIG. 1a. An important difference is that the separating valve 4 is hydraulically actuated. The valve is operated by the pump pressure; once the pump delivery starts upon commencement of a control, the valve is re-switched by the pump pressure that is developing. However, this is only one among a variety of actuation capabilities. Other alternatives include, for example, using the pressure decrease between the wheel brake and the outlet valve 6 upon commencement of a control. Another alternative would be to use the pressure rise between the outlet valve 6 and the pump 7. A mechanical actuation also could be considered in which the valve could be coupled to the piston of the high pressure accumulator 12. Also, the axial movement of the shaft of motor M actuating the pump 7 could be used.

Another feature of FIG. 2 is the combination with the check valve 10 forming a combination valve 30. The combination valve 30 contains a common valve body 22 having one closure element at each end that cooperates with valve seats 23 and 24, respectively. The valve body 22 is sealingly guided by a sealant 21. The chambers of the valve are interconnected through restriction valve 9 disposed respectively downstream. Pressure is built up in the master cylinder and applied to the front side of the piston 22 (right side according to the drawing) forcing the piston against the valve seat 24 blocking the check valve 10. Once pump pressure is developed it is forced against the front side of the piston 22 (left side according to the drawing) moving the piston against the sealing seat 23 so that the separating valve 4 is blocked and the check valve opened allowing pressure fluid to enter the brake conduit through the restriction element 9.

The closure members need not be formed integrally with the piston. It is equally possible to provide balls that can be applied to the opposite front side of the piston.

In the embodiment of FIG. 2 a check valve 26 serves the switching function of the differential pressure sensor 15 from FIG. 1a by directly connecting the wheel brakes to the master brake cylinder.

The switching system of FIG. 2 includes an additional inlet valve 25 in the brake conduit between the separating valve and the wheel brake. A valve of that type also could be employed in the other embodiments, there performing the same function as described hereinafter. In lieu of the additional inlet valve 25, an additional check valve 27 may be provided in the master brake conduit. Further, the separating valve 4 may be in the form of a check valve provided in the brake conduit. A pressure decrease is effected through check valve 26.

The embodiment depicted in FIG. 2 contains one pump and one separating valve for each brake circuit.

Figure 3:
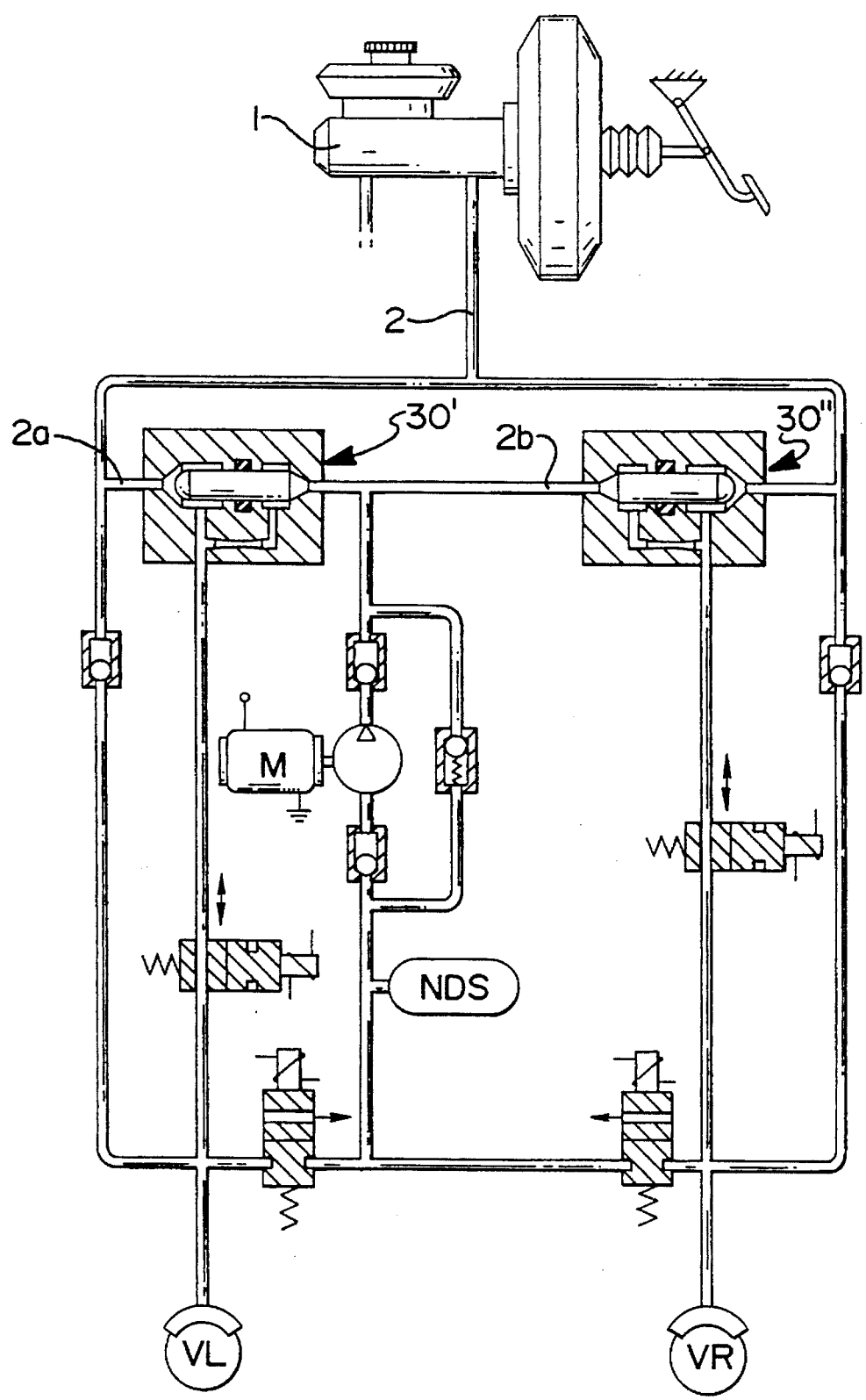
FIG. 3 shows a front brake system with hydraulically actuable separating valves.

FIG. 3 shows a modification of a front wheel brake circuit wherein one separating valve 4 is provided for each wheel brake. The brake conduit is subdivided into two branch conduits 2a, 2b each comprising one separating valve 4 and one combination valve 30', 30", respectively.

A corresponding modification to the embodiment of FIG. 1a is also possible.

Figure 4:
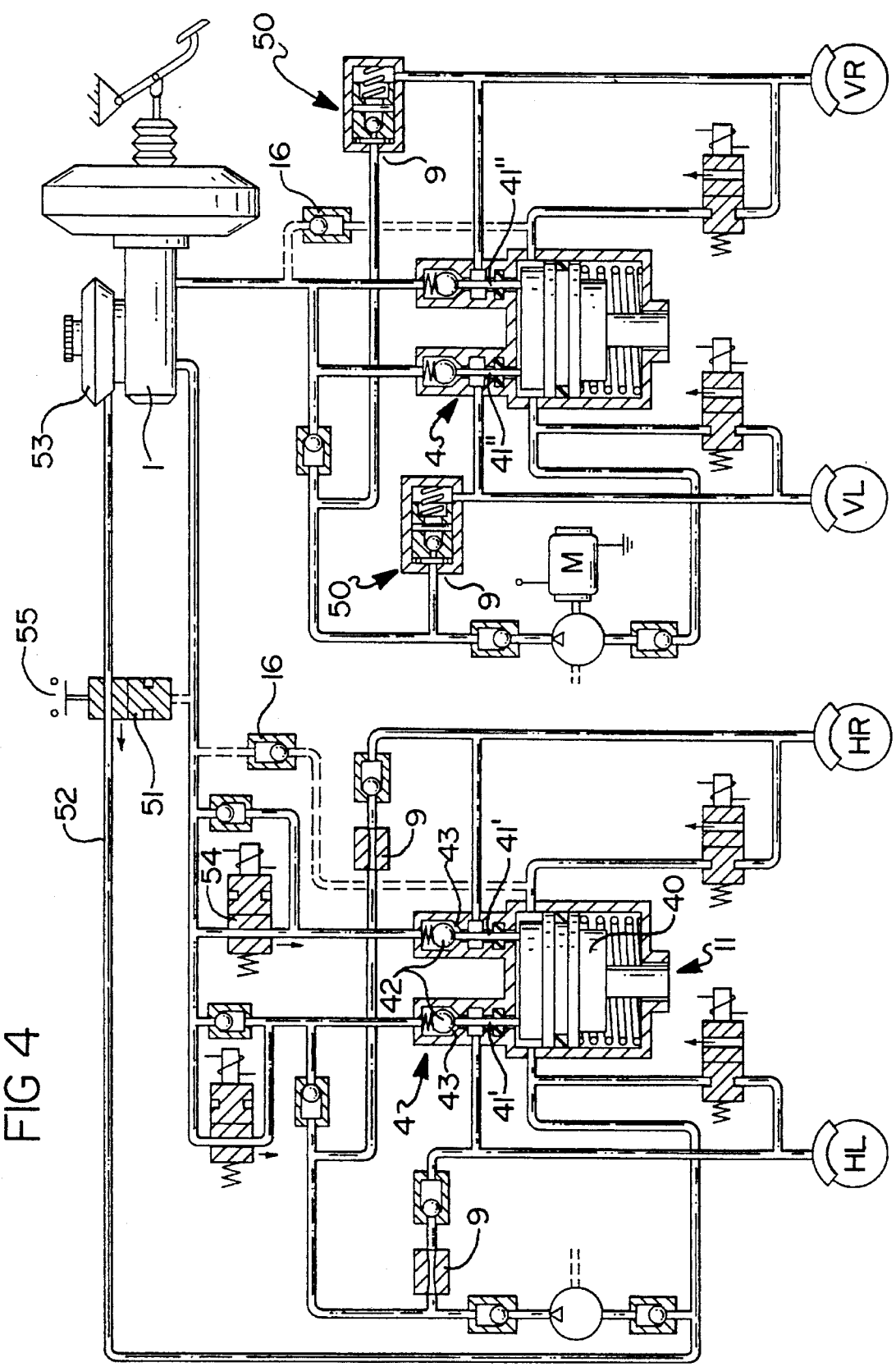
FIG. 4 shows a brake system with separating valves actuated by the piston of the low pressure accumulator with an anti-slip control (ASR).

The embodiment of FIG. 4 includes a dual circuit brake system comprising one pump for each brake circuit. Both brake conduits have a separating valve 4 and branch toward the wheel brakes.

The separating valves of a brake circuit are actuated by plungers 41', 41" fixed to piston 40 of the low pressure accumulator 11. As the low pressure accumulator is filling up the plungers 41' and 41" separate from the valve bodies 42. In this configuration, a valve spring forces the valve bodies 42 onto a valve seat 43 blocking the brake conduit. An outlet valve is associated with each wheel brake. A restriction element 9 is provided in each pressure conduit between the pump and the brake conduits.

Incidentally, the general statements regarding the embodiment of FIG. 1a apply. In particular, any desired brake circuit division can be considered. It is possible to use flow control valves 50 for the wheel brakes of the front axle and simple diaphragms for the wheel brakes of the rear axle. High pressure accumulators can be associated with the pumps, as well as release valves which, optionally, can be actuated by the piston of the high pressure accumulator. The check valves 16 directly join the low pressure accumulator 11 and perform the same function as described in the discussion of the embodiment of FIG. 1a.

Moreover, FIG. 4 shows a possible extension of the system to traction slip control ASR-operation. The same applies to the systems depicted in FIGS. 1a, 2 and 3. For that purpose, electromagnetically actuable by-pass valves 54 are provided in the brake conduits between the separating valves 4 and the master brake cylinder 1. These valves are designated as ASR-valves and are required only in the brake conduits leading to the driven wheels. Moreover, an intake line 52 is provided between the intake side of the pump and a pressure fluid reservoir 53. A by-pass valve 51 which is normally open is provided in the intake conduit 52. The by-pass valve is actuated by the pressure of the master cylinder in a manner that the intake conduit is blocked in a deceleration process. In that case, a closed system is provided. A traction slip control will be effected only if no master brake cylinder pressure exists. To ensure this, the pump can take in pressure fluid from the reservoir 53 to fill the brake circuits. According to FIG. 4, the intake conduit 52 directly joins the reservoir 53, however, that configuration is not imperative. The intake conduit 52 could also join one of the master cylinder chambers. The brake pedal is inoperative during an ASR-control operation. Therefore, there is a communication between the chambers of the master brake cylinder and the reservoir 53 and the pump can take in pressure fluid, through a master cylinder, from the reservoir 53.

The by-pass valve 51 also can be actuated electromagnetically. In that case a pressure switch is needed to determine whether the master cylinder is non-pressurized. In that case and in the event of a required ASR-control, the by-pass valve 51 opens the communication with the reservoir either directly or through the master brake cylinder. FIG. 4, moreover, symbolically, shows a switch 55 which is actuated once a pressure has developed in the brake conduit. The switch can directly measure the pressure or determine the movement of the valve body of the by-pass valve 51. That switch is intended to determine whether an ASR-control is decelerated.

Another alternative (not shown) especially applies to all cases where a diagonal division is provided. In those cases the valves can be switched so that the pump takes in through a pressure fluid path extending through the wheel brake of the non-actuated wheel.

The systems according to FIGS. 1a, 2, 3, and 4 so far described operate according to the following pattern:

In the basic position of the system, the separating valves are opened and the outlet valves blocked. The ASR valves shown in FIG. 4 are also open. By applying the symbolically shown pedal, pressure fluid is displaced through the brake conduits 2 and 3 and the branches thereof into the wheel brakes. A brake pressure builds up which causes deceleration of the vehicle. The check valves 10 prevent pressure from being built up in the pressure conduit. As the restriction element 9 is not provided in the brake conduit it cannot cause a disturbing effect on the pressure build-up during a decelerating operation.

During a decelerating operation, the rotating pattern of the wheels is permanently monitored by means of sensors (not shown). The sensor signals are evaluated by an analyzer (not shown) to immediately determine if one of the wheels tends to lock. At that moment, the system switches to the anti-locking mode in which the pump is rendered operative and the outlet valves are opened. At the same time, a signal is supplied to the actuating magnets of the separating valves (according to FIG. 1a) causing them to block.

Pressure is built up in the conduit, blocking the separating valve according to FIG. 2 and FIG. 3, respectively. The pressure conduit, at the same time, is shown to be released. The pressure fluid discharged into the low pressure reservoir 11, according to the embodiment shown in FIG. 4, causes the plungers to separate from the valve bodies 42 causing the separating valves 4 to close. It is, therefore, insured in all forms of embodiment that the brake conduit, in the anti-locking mode, is blocked. The pump now delivers pressure fluid through the restriction valve 9 into the brake conduit below the separating valve and then into the wheel brake. The outlet valves are now cyclically actuated; they are repeatedly opened and closed in short sequences:. The amount of pressure fluid flow passed through the outlet valves 6 into the low pressure accumulator 11 depends on the ratio of opening-to-closing time. If the pressure fluid flow exceeds that flowing through the diaphragm and the flow control valve 9, respectively, the pressure in the wheel brake is decreased. If the pressure fluid flow is less, brake pressure is increased. By successively increasing and lowering the pressure in the wheel brake, an optimum slip value can be adjusted which insures high brake decelerations and enables the wheel to develop lateral guiding forces.

The additional inlet valves shown in FIGS. 2 and 3 fulfill two functions. Especially in embodiments where the separating valve 4 is not electromagnetically actuated, a certain delay may occur during closing of the valve upon commencement of a brake slip control. In order to prevent the master brake cylinder 1 from being excessively evacuated by such a delay upon commencement of a brake slip control, the additional inlet valve 25 can be blocked temporarily until the hydraulically or mechanically actuated separating valve closes.

Another problem resides in insuring a complete pressure build-up in the wheel brakes. As the pump permanently delivers pressure fluid to the wheel brakes, through the restriction valve 9, the pressure in the wheel brakes, in certain circumstances, may not be completely removed. In such a situation, the additional inlet valve 25 can be closed so the pressure is completely removed with the outlet valve opened.

As the above two situations de not occur very frequently, the additional inlet valve is actuated rarely giving the advantage of avoiding the noise development connected with the operation of the inlet valve.

In addition, the system must insure that upon releasing the brake pedal a pressure decrease immediately occurs in the wheel brakes. This can be effected through the check valves 26 directly connecting the wheel brakes to the master brake cylinder. In electromagnetically actuated separating valves as shown in FIG. 1a, a differential pressure switch can be provided also to determine the differential pressure between the master brake cylinder and the wheel brake. In case of an occurring difference the separating valve will open until a corresponding pressure equilibrium is achieved.

Another important function is performed by the check valves 14 shown in FIGS. 1a and 4 which can also be provided in the embodiments of FIGS. 2 and 3. When lane surfaces have varying frictional values the brake slip control may start at a low frictional value. Under these circumstances the pressure fluid enclosed in the control circuit will be just enough to build up a brake pressure corresponding to the low frictional value. If the wheels then reach a higher frictional value, a higher brake pressure can be developed without causing the wheels to lock. This may be well intended by the driver as manifested by a correspondingly strong pedal actuation. If a wheel now changes from a low to a high frictional value, the pump will deliver all of the pressure fluid contained in the control circuit underneath the separating valve, into the wheel brake, thereby emptying the high pressure accumulator and causing the pressure on the outlet of the pump to decrease. At that moment, pressure fluid can flow into the control circuit through the opening check valves 14.

FIG. 4 additionally shows the capability to realize a traction slip control (ASR). Should a control of that type be required, the pump drive would be actuated so that the pump will take pressure fluid from the pressure fluid reservoir 53 through the open by-pass valve. At the same time, the ASR-valves are closed, thereby preventing pressure fluid from flowing back into the master brake cylinder. A pressure control similar to an anti-locking control, can be performed with the pressure fluid now contained in the brake circuit, thereby adjusting a traction slip on the wheel brakes enabling maximum driving torques and lateral guiding forces to be transferred.

Figure 5:
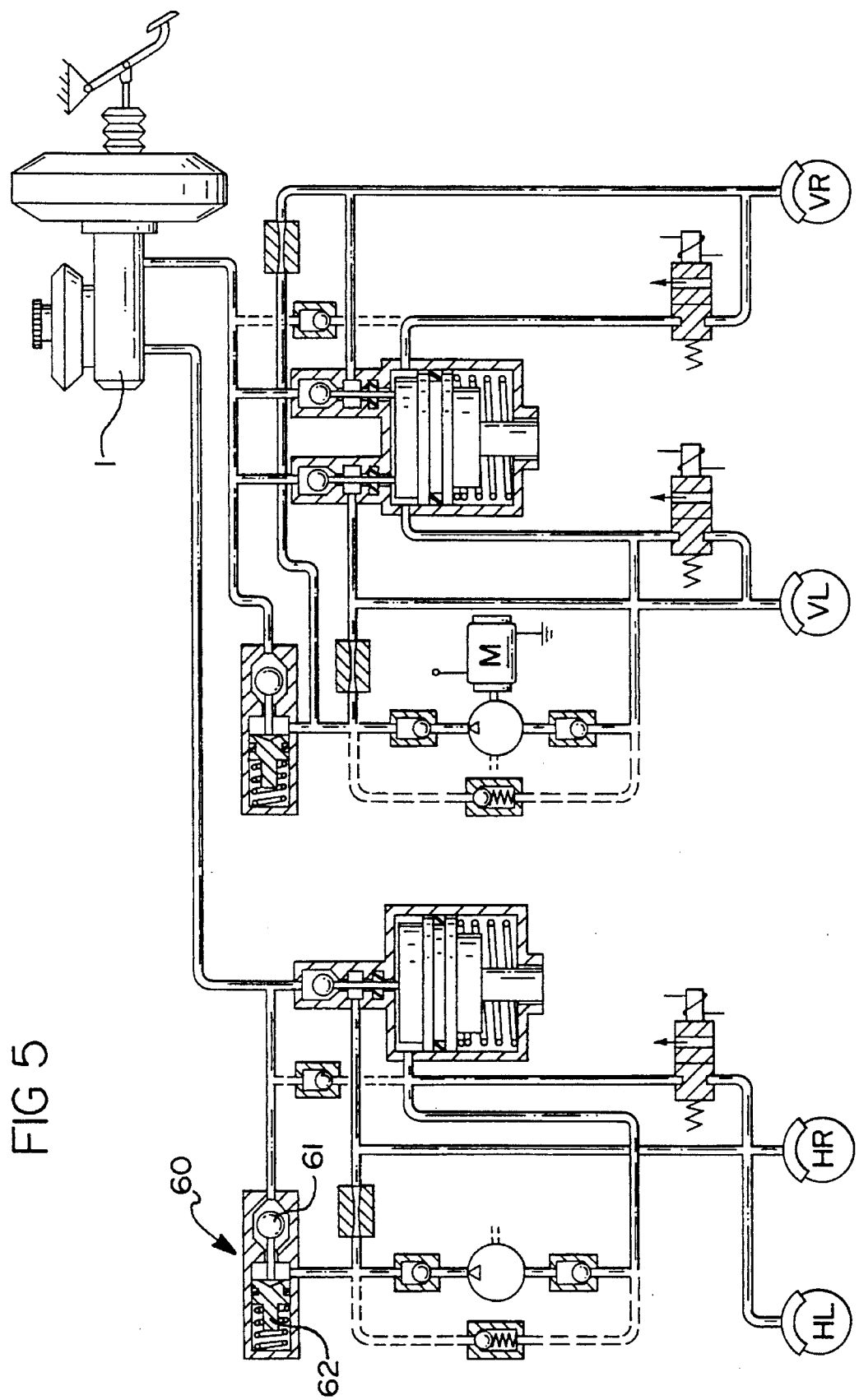
FIG. 5 shows a brake system with separating valves actuated by the piston of the low pressure accumulator with a dual check valve.

FIG. 5 shows a variation of the embodiment of FIG. 4. However, the principle basically can be transferred to all similar systems. A check valve 60 between the master brake cylinder and the pressure side of the pump is shown unblockable. Provided on the valve body 61 of the check valve is a piston 62. The piston 62 operates against a spring and is exposed to the pump pressure or, when the check valve is opened, to the master cylinder pressure. Provided the switch-over pressure has not been reached, the check valve blocks toward the master brake cylinder. If the pump pressure is less than the switch-over pressure, the piston 62 releases the valve body 61 so that the check valve blocks from the master cylinder toward the pump, thereby precluding further pressure fluid from the master brake cylinder being supplied into the pump circuit.

It will be apparent to those skilled in the art that the foregoing disclosure is exemplary in nature rather than limiting, the invention being limited only by the appended claims.

What is claimed is:

1. An anti-locking hydraulic brake system comprising:
   a master brake cylinder connected to a wheel brake through a brake conduit;
   a separating valve for blocking said brake conduit;
   a return conduit connecting said wheel brake to an intake side of a pump;
   an outlet valve within said return conduit;
   a pressure conduit connecting a pressure side of said pump to said brake conduit between said separating valve and said wheel brake;
   a restriction element in series with a check valve within said pressure conduit, and wherein no intervening elements are disposed between said restriction element and said check valve, said check valve opening toward said brake circuit and said restriction element including means for providing continuous restricted flow regardless of pressure; and
   a differential pressure switch connected in parallel to said separating valve, both of which share a common input and a common output.

2. A brake system as recited in claim 1, wherein said separating valve is electromagnetically actuated.

3. A brake system as recited in claim 1, wherein said restriction element comprises a diaphragm of constant cross-section or a flow control valve.

4. A brake system as recited in claim 1, wherein said restriction element comprises a diaphragm of constant cross-section.

5. A brake system as recited in claim 1, wherein said restriction element comprises A flow control valve.

6. A brake system as recited in claim 1, further comprising allow pressure accumulator connected to the intake side of said pump through a check valve opened toward said pump.

7. A brake system as recited in claim 1, wherein said differential pressure switch is adapted to determine the differential pressure between the master brake cylinder and said wheel brake.

8. An anti-locking hydraulic brake system comprising:
   a master brake cylinder connected to a wheel brake through a brake conduit;
   a separating valve for blocking said brake conduit;
   a return conduit connecting said wheel brake to an intake side of a pump;
   an outlet valve within said return conduit;
   a pressure conduit connecting a pressure side of said pump to said brake conduit between said separating valve and said wheel brake;
   a restriction element in series with a check valve within said pressure conduit, and wherein no intervening components are disposed between said restriction element and said check valve, said check valve opening toward said brake conduit, and said restriction element including means for providing continuous restricted flow regardless of pressure; and
   a differential pressure switch adapted to determine the differential pressure between the master brake cylinder and said wheel brake, said differential pressure switch being connected in parallel to said separating valve, both of which share a common input and a common output.

* * * * *

UNITED STATES PATENT AND TRADEMARK OFFICE
CERTIFICATE OF CORRECTION

PATENT NO. : 5,564,798
DATED : October 15, 1996
INVENTOR(S) : Zaviska et al

It is certified that error appears in the above-indentified patent and that said Letters Patent is hereby corrected as shown below:

Column 8, line 8, delete "A" and substitute therefor --a--

Column 8, line 10, delete "allow" and substitute therefor --a low--

Signed and Sealed this

Seventh Day of January, 1997

Attest:

Attesting Officer

BRUCE LEHMAN
Commissioner of Patents and Trademarks